United States Patent
Sher et al.

(10) Patent No.: US 7,243,150 B2
(45) Date of Patent: Jul. 10, 2007

(54) REDUCING THE ACCESS DELAY FOR TRANSMITTING PROCESSED DATA OVER TRANSMISSION DATA

(75) Inventors: Sharon Sher, Bat-Hefer (IL); Adi Nativ, Or-Yehuda (IL)

(73) Assignee: Radwin Ltd., Tel Aviv (IL)

( * ) Notice: Subject to any disclaimer, the term of this patent is extended or adjusted under 35 U.S.C. 154(b) by 561 days.

(21) Appl. No.: 10/192,839

(22) Filed: Jul. 10, 2002

(65) Prior Publication Data

US 2004/0010623 A1  Jan. 15, 2004

(51) Int. Cl.
*G06F 15/173* (2006.01)
(52) U.S. Cl. ............... 709/225; 709/223; 709/224; 709/226
(58) Field of Classification Search ........ 709/230–237, 709/248, 205, 223–226
See application file for complete search history.

(56) References Cited

U.S. PATENT DOCUMENTS

| | | | |
|---|---|---|---|
| 3,418,579 A | 12/1968 | Hultberg | |
| 4,472,802 A | 9/1984 | Pin et al. | |
| 4,774,708 A * | 9/1988 | Hotta | 370/321 |
| 5,107,492 A * | 4/1992 | Roux et al. | 370/438 |
| 5,883,891 A | 3/1999 | Williams et al. | |
| 6,031,846 A | 2/2000 | Gurusami et al. | |
| 6,075,796 A | 6/2000 | Katseff et al. | |
| 6,091,717 A * | 7/2000 | Honkasalo et al. | 370/329 |
| 6,181,712 B1 * | 1/2001 | Rosengren | 370/474 |
| 6,356,555 B1 * | 3/2002 | Rakib et al. | 370/441 |
| 6,577,640 B2 * | 6/2003 | Mansouri et al. | 370/429 |
| 6,584,502 B1 * | 6/2003 | Natarajan et al. | 709/224 |
| 6,920,148 B1 * | 7/2005 | Kato | 370/442 |

OTHER PUBLICATIONS

"Investigating Factors Influencing QoS of Internet Phones" Su, et al. IEEE 1999, pp. 541-546.
"Measuring Internet Telephony Quality: Where are we Today?" Hagsand, et al., IEEE; Global Communications Conference-Globecom 1999, pp. 1838-1842.

* cited by examiner

*Primary Examiner*—Glenton B. Burgess
*Assistant Examiner*—Brendan Y. Higa
(74) *Attorney, Agent, or Firm*—Katten Muchin Rosenman LLP

(57) ABSTRACT

The present invention describes a method and apparatus for reducing the access-delay and transmission latency in a system where a network terminal modem terminates to a network over a transmission media. In a network the processing of input data to be transmitted as processed data on the transmission media is synchronized with a time period when the transmission media is to be allocated for transmitting the processed data. Synchronization is achieved by determining when access to the transmission media will be granted for transmitting the processed data and synchronizing the processing of the input data with the determined time. Thereby the synchronizing results in the processing being completed at a time relatively close to the time when access to the transmission media is granted. Thus the need to store the processed data awaiting transmission is significantly reduced and thereby reducing the access delay and transmission latency.

10 Claims, 6 Drawing Sheets

REDUCING THE ACCESS DELAY FOR TRANSMITTING PROCESSED DATA OVER TRANSMISSION DATA

BACKGROUND OF THE INVENTION

Delivery of real time services over networks is playing an increasingly important role in the popularity of network applications. In designing solutions for real time applications, quality of service considerations become very important. One of the crucial technical attributes that affect the quality of service in delivering real time application solutions is the system latency.

One important example of a real time service is VoIP (Voice-over-IP). In an example of a voice system, voice transmission quality is a primary concern. In such a system, latency is the time delay of the speech incurred by the system. It is measured from the moment the speaker utters a word until the listener actually hears it. System latency of voice transmission on a network may be influenced by many factors. For example, in a VoIP system, it takes time to collect voice samples, process them, and create IP packets. Then, when the packets are actually shipped across a network, they run into routing and other variable delays. To keep variations in delay (jitter) from degrading voice quality, a jitter buffer is used at the receiving end to store the incoming voice packets and then play them out at a constant rate. But again the time the voice data spends in the jitter buffer adds to the system latency.

The amount of latency tolerated is a subjective issue, but it is agreeable that a maximum exists. Common figures grade VoIP services with latency shorter than 150 milliseconds as having excellent quality, while any service with latency longer than 300 milliseconds is graded as "poor quality service". Since latency is cumulative, any latency introduced by a component in the system will directly affect the total latency experienced by the user. Likewise, reducing latency in any component of the system will improve overall latency and voice quality.

Generally, an IP Telephony system is constructed using 2 VoIP gateways that interconnect using a network. Latency in such a system is introduced by the gateways at both ends and by the network that connects the two gateways. The gateway latency is influenced by the processing occurring inside the gateway. On the transmitting side, each of the main processes inside the gateway: Framing, Vocoding (or Voice Compression) and Packetization, has its own latency that contributes to the overall gateway latency. On the receiving side the compatible processes have their own effect on overall latency.

As input bits of data are received for gateway processing at the transmitting side they are grouped together in frames. Since Vocoding is performed on entire frames (or batches) of data, a full frame of bits must be collected before any processing is done. The side effect of processing data in frames is a framing latency of one frame duration and therefore, the size of the frame will affect the framing latency. Deciding on the frame size is a compromise: the larger the frame, the greater the vocoding efficiency, but with that comes greater framing latency. Each of the VoIP standards common nowadays uses a standard frame size, thus, the latency of the framing process is directly dependent on the selection of the Vocoder, and can not be altered.

After the collection of an entire frame is completed, a DSP algorithm is used to perform the Vocoding/Voice-Compression algorithm. The latency introduced by this process varies and depends on the vocoding standard, and the software and hardware implementation of it. Current DSPs and progress in vocoding algorithm implementations have advanced, making the Vocoding-latency a relatively short one.

Packetization has to do with preparing coded data for transport over the network, thus assembling the data into packets. The Packetization process carries its own latency, depending on the number of frames packed into one packet. Once the data is packetized and ready for transport across the network, the packet must wait until the transmitting device, for example a gateway, has access to the network. This access time may be referred to as access latency.

Once the packet data leaves the gateway, it starts its path in the network. Passing data over the network introduces the Network Latency. This latency depends on the media being used, the actual routing scenarios, firewalls and proxy servers delays. Since there are many different options, network latency figures vary on a wide scale.

Once the packets are received at the receiver's gateway the reverse processing occurs which introduces additional latency to the overall delay.

Access Latency, as described above, is another source of latency and is introduced when the transmitter must wait to gain access to the transmission medium to transmit waiting data. In some network configurations, one or more parts of the network use a shared media. A shared media refers to a situation where a number of transmitters use the same physical link for transmission. This is common, for example, to the uplink scenario in Point to Multipoint Access systems such as a Wireless Access system where a group of users communicate over the same wireless link with the base station, or a Cable TV network configuration where users communicate via the same cable media with the head-end. There are many other examples of shared media scenarios too numerous to mention them all here.

As an example when a transmitter transmits data, the shared transmission media is allocated to each transmitter for the duration needed for transmission. When the shared media is not allocated for a user to transmit, the data must be stored at the transmitter until the media is available. This storage of data at the transmitter until the media is available introduces additional latency which adds to and is a part of the overall network-latency. In particular this additional latency may be referred to as Access-Latency. Access-Latency is caused by the time the data are stored at the transmitter before the shared transmission media is assigned for that specific transmitter for transmission of its stored data.

FIG. 1 shows an example of an environment where a group of transmitters use the same media to transmit data, each transmitter may be part of a Network Terminal Modem (terminal). FIG. 1 illustrates two Network Terminal Modems terminal 1 (10) and terminal 2 (20). Terminal 1 (10) and terminal 2 (20) terminate to the network over the same shared transmission media (30). Each of the different terminals independently executes processing and preparation of data for transmission onto the shared transmission media (30). The processed data is stored at the terminal until the media (30) is available for the specific terminal. Each instance the media (30) is available for a specific terminal it sends the processed data into the shared media (30) in, for example, a First-In-First-Out mode. It is inevitable that delay is introduced in this process, caused by the time for storing the processed data and the time that passes until the specific terminal is assigned with "permission" to transmit. This Access-Latency adds to the overall system latency and causes a degradation in the quality of service.

In applying an example of a VoIP system to FIG. 1, each terminal would transmit VoIP packets when the shared transmission media is allocated to each terminal. When the shared media is not allocated to a terminal, the terminal must store the VoIP packets until the media is available. Using FIG. 1 to illustrate this example, a group of terminals use the same media to transmit VoIP packets. The terminal also includes a VoIP gateway for providing VoIP services.

Each of the terminals, terminal 1 (10) and terminal 2 (20) of FIG. 1, independently executes the VoIP gateway processes. In other words, each terminal frames, vocodes and packetizes the voice-data independently of the other terminal, preparing a "bank" of VoIP packets, ready for transmission over the shared media (30). The bank of VoIP packets is stored at the terminal transmitter until the media (30) is available for the specific terminal. Each instance the media (30) is available for a specific terminal, that terminal sends the packets onto the shared media (30). Thus Access-Latency is introduced in the process of storing the banks of VoIP packets plus the time that passes until the specific terminal is assigned with "permission" to transmit the stored banks of VoIP packets, plus retrieving and sending the stored banks of VoIP packets.

FIG. 2 shows a timing diagram for the example of FIG. 1. In FIG. 2 terminal 1 (10) and terminal 2 (20) process the data independently from the point in time when each terminal is allocated access to the shared media. As shown in the example of FIG. 2, terminal 2 (20) begins its packet processing at t1 which is before terminal 1 (10) begins its packet processing at t2. In other words each terminal begins it processing without regard to the time when it will be granted access to the shared media to transmit the processed packet.

Each terminal has a processing delay associated with preparing the data for transmission on the shared media. Terminal 2 (20) completes its packet processing at t3 and terminal 1 (10) completes its packet processing at t4. Each terminal stores its packets waiting for access to be granted to transmit to the shared media.

As illustrated in FIG. 2, terminal 1 (10) gains access to the shared media at t5 and terminal 2 (20) gains access at t6. The packets from terminal 1 (10) are transmitted to the network during Access 1 (lasting from t5 to t6) and once the packets are in the network additional network latency is incurred. The packets of terminal 1 (10) arrive at their destination at t8. Similarly, the packets from terminal 2 (20) are transmitted to the network during Access 2 (lasting from t6 to t7) and thereafter incurring network latency and arriving at their destination at t9.

As previously described both terminal 1 (10) and terminal 2 (20) must store the packets from the time packet processing is completed until access to the shared media (30) is granted to transmit the packets. In addition terminal 2 (20) completed its packet processing prior to terminal 1 (10), however terminal 1 (10) has access to the media (30) prior to terminal 2 (20), this adds additional inefficiencies and delay to the packets of terminal 2 (20).

Because there is no synchronization between the processing in the gateway of the terminals and when the shared media is allocated to each terminal, each terminal completes processing at a time independent of when the packets are to be transmitted and the packets must be stored until access to the shared media is granted. The times for waiting, storing and retrieving of the packets add to the latency of the system and the quality of service decreases.

As described, the prior shared media systems suffer from Access-Latency introduced when there is no synchronization between the timing of the processes and processing of the different terminals and the time when access to the shared media is granted. Each terminal processes data independently of the other terminals and independent of the terminal's access time thus adding to overall system latency.

Accordingly the present invention reduces the network-latency by reducing this Access-Latency. This may be achieved by a synchronization process that synchronizes the data processing of each of the different terminals/transmitters to the time the shared media will be granted for transmission. This synchronization process allows the processing of the data to be completed relatively close to the time when the shared media is granted, thus reducing network-latency and buffering of the packets waiting for network access.

SUMMARY OF THE INVENTION

The present invention describes a method and apparatus for reducing the access-delay and transmission latency in a system where a network terminal terminates to a network over a transmission media. In such an environment utilizing a transmission media among network terminals, the transmitter of each network terminal is provided with a time for transmitting data to the transmission media. A network terminal, knowing in advance when its time for transmitting data begins, will determine when to begin processing input data such that the processing is completed relatively close to the time for transmitting the data, thus allowing the processed data to be transmitted.

For example, in a network, the processing of input data to be transmitted as processed data on a transmission media is synchronized with a time period when the transmission media is to be allocated for transmitting the processed data. Synchronization is achieved by determining when access to the transmission media will be granted to a terminal for transmitting processed data and synchronizing the processing of input data therewith. The processing of the input data may begin such that the processing completes relatively close to when access is granted.

DESCRIPTION OF THE PREFERRED EMBODIMENTS

According to the method presented herein, a synchronization process is employed to synchronize the processing of input data of a network terminal to the time when that network terminal (terminal) has access to a transmission media to transmit the processed data. The synchronization process that should be implemented will determine in advance a time or a point in time when the transmission media is to be allocated to a specific network terminal for transmission. Having determined this time, the synchronization process will enable the terminal to calculate and/or determine a point in time to start the processing of the input data such that completion of the processes within the terminal is relatively close to the time when the transmission media is allocated to that terminal. This allows the processed data to be transmitted onto the transmission media close to the time when the processing was completed. Because the data can be transmitted onto the transmission media when processing is completed, the need to store the processed data is significantly reduced. This reduces delay involved in the access process, resulting from the storage process of the processed data, prior to the release of the processed data into the transmission media.

As illustrated in an example of a VoIP network, the VoIP gateway processes (framing, vocoding and packetizing) are synchronized with the time when access to the transmission media will be granted for transmitting the VoIP packets. Thus the processing of input data to provide the VoIP packets to be sent into the transmission media commences at a time that will result in completion of the processing relatively close with the time when the transmission media is allocated to transmit the packets. Because of this synchronization of the Gateway processes in terminals accessing the network over a transmission media, storage delay is reduced, thus reducing the access delay and contributing to the crucial need to shorten latencies in VoIP services.

As can be imagined this synchronization of the terminal processing is valid for any type of processing and is not limited to the VoIP examples. For example whenever a terminal has an allocated time to transmit information, the terminal may synchronize the internal processing of information for transmission with the allocated time, thus reducing storage or buffering delays.

Figure 3A:
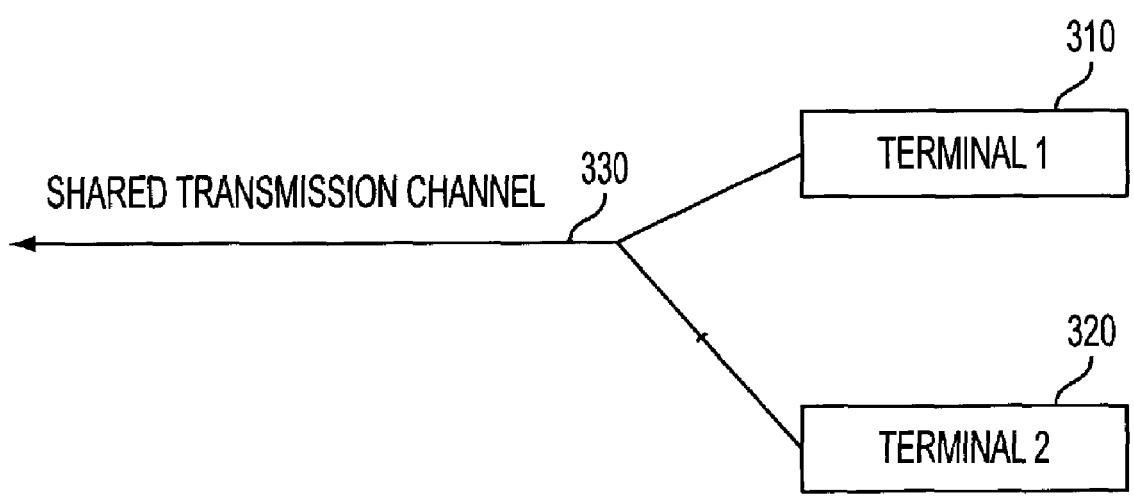
FIG. 3a is a block diagram illustrating a two terminal system implementing a shared transmission media with synchronized processing.

FIG. 3a shows an example of a simple two-user scenario utilizing synchronization of the data processing with the timing of access to a shared media (330).

In this example the two transmitters use the same transmission media (330) to transmit processed data, each transmitter is a part of a Network Terminal Modem (terminal). FIG. 3a illustrates two Network Terminal Modems, terminal 1 (310) and terminal 2 (320). Terminal 1 (310) and terminal 2 (320) terminate to the network over the shared transmission media (330). Each terminal determines in advance the time when the shared media (330) will be allocated to a terminal for transmission. For example terminal 1 (310) will determine the time when the shared media (330) will be allocated to terminal 1 (310) for transmission of its data. The terminals may use any method where the terminal may determine in advance the time when the shared media (330) is to be allocated to the terminal for transmission of data.

Having determined this time, the synchronization process will enable terminal 1 (310) to calculate and/or determine a point in time to start the processing of the input data such that completion of the processing relatively coincides with the time when the shared media (330) is allocated to terminal 1 (310). This allows the processed data of terminal 1 (310) to be transmitted onto the shared media. Each of the terminals, terminal 1 (310) and terminal 2 (320), executes the processes synchronized to the time when it will be granted access to the shared media (330) for transmitting its data.

Figure 1:
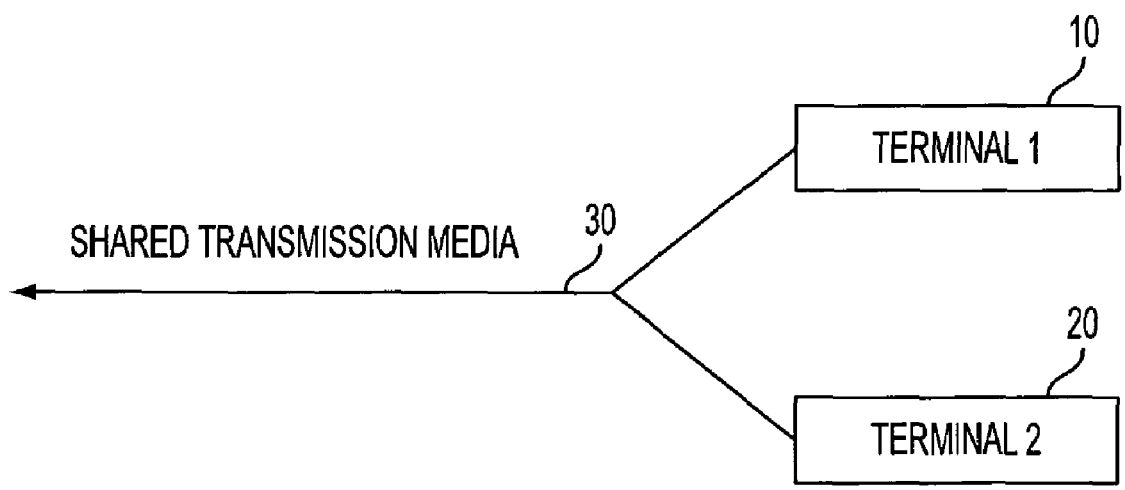
FIG. 1 is a block diagram illustrating a two terminal system implementing a shared transmission media.
Figure 2:
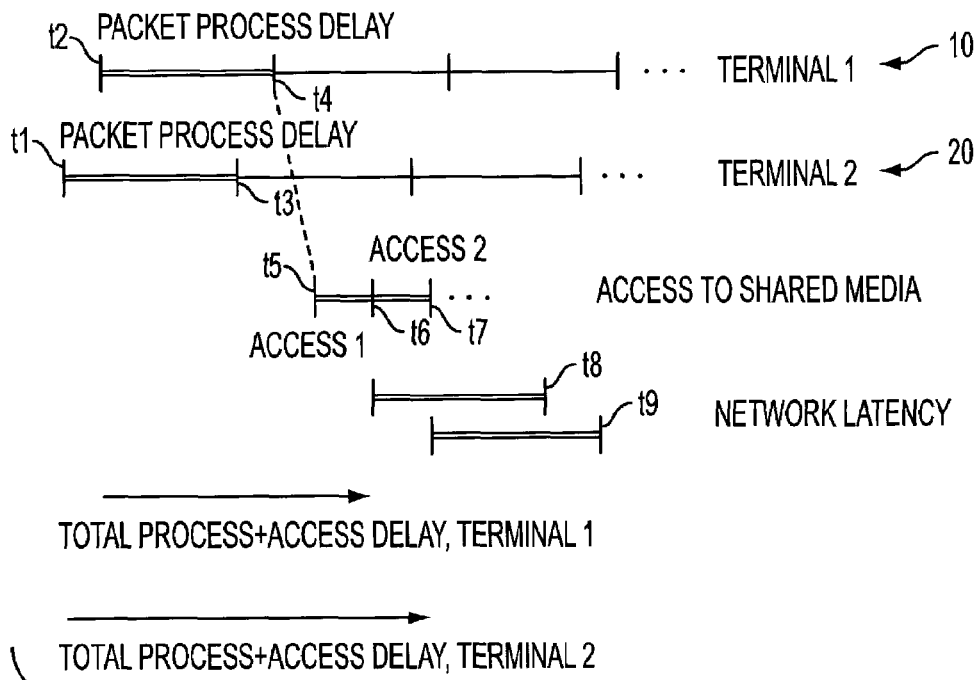
FIG. 2 illustrates a timing diagram of a two terminal system with no synchronization of processing of input data.
Figure 4:
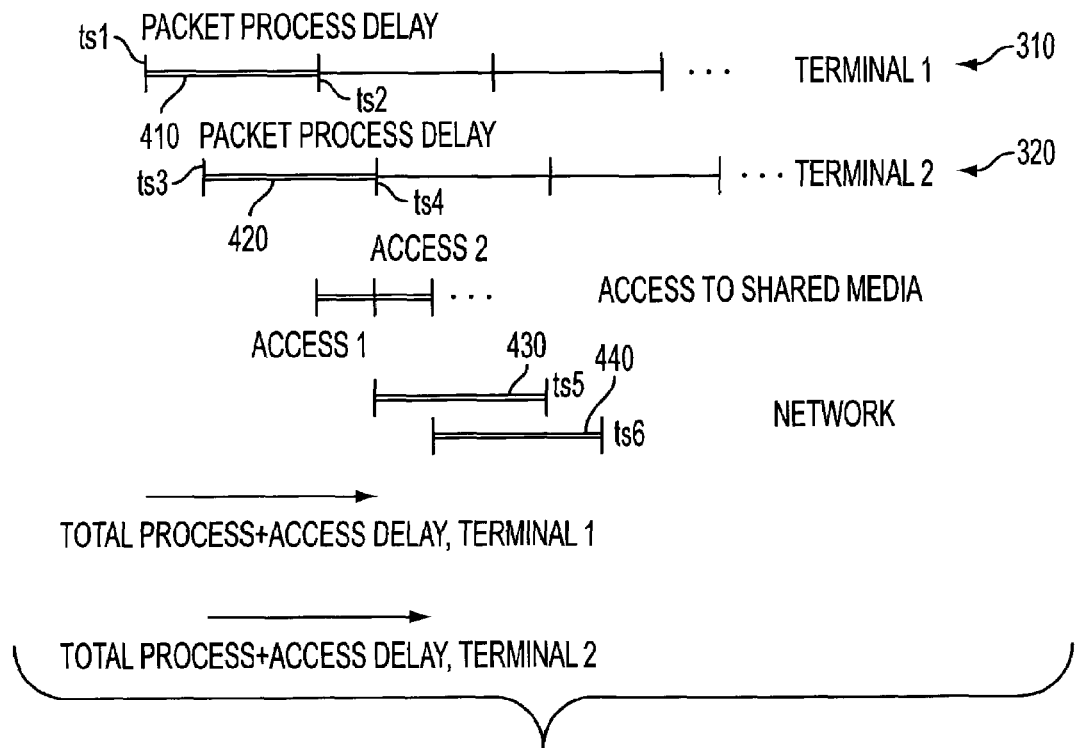
FIG. 4 illustrates a timing diagram of a two terminal system where synchronization of the processing of input data is implemented.
Figure 3B:
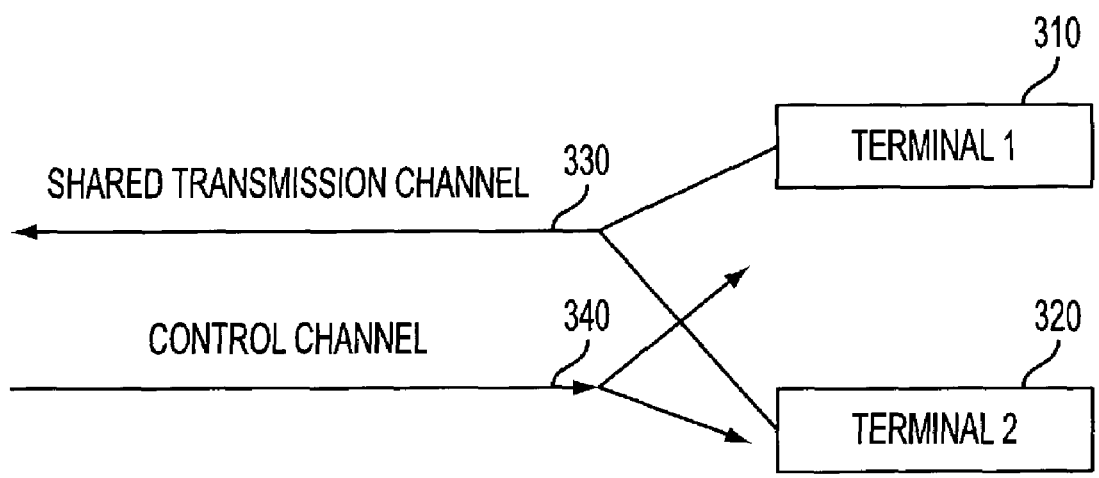
FIG. 3b is a block diagram illustrating a two terminal system implementing a shared transmission media with a control channel.

FIG. 4 illustrates a timing diagram of the simple two-user scenario of FIG. 3a utilizing synchronization of the processing with the timing of access to the shared media. In this two-user example each terminal is allocated a period of time for accessing the network. Terminal 1 (310) is allocated time period Access 1 beginning at time ts2 and terminal 2 (320) is allocated time period Access 2 beginning at time ts4. Each terminal during its allocated time period will transmit its data or packets onto the shared transmission media (330). By utilizing the synchronization process each terminal determines in advance when it will be granted access to the shared media (330). This synchronizing may be implemented by many methods for example, a synchronized system clock, highly accurate clocks within the terminals, by receiving timing information, for example, through a control channel (340), as shown in FIG. 3b, or any other method where the terminal may determine in advance the time the shared media (330) is to be allocated to the terminal for transmission of data. In the example shown in FIG. 3b and FIG. 4, terminal 1 (310) determines a point in time when access will be granted for transmission of its packets and calculates or determines when to start processing the input data so that completion of processing is relatively close to the point in time when access to the transmission media is available. In an optimal example the completion of processing will coincide with the time when access to the transmission media is available.

Terminal 1 (310) determines that Access 1 begins at a point in time ts2. From this point in time ts2, terminal 1 (310) subtracts the known processing delay time (410) and thereby arrives at a time ts1 to start processing the input data. The result of this subtraction is the point in time ts1 when processing of the input data must begin in order to complete processing at the point in time ts2 when access to the shared media (330) is granted to terminal 1 (310).

Terminal 2 (320) exercises a similar procedure, for example, terminal 2 (320) calculates when processing of the input data must begin in order to complete the data processing in terminal 2 (320) when access to the shared media (330) is granted to Terminal 2 (320). Terminal 2 (320) determines that Access 2 begins at a point in time ts4. From this point in time ts4, terminal 2 (320) subtracts the known processing delay time (420) and thereby arrives at a time ts3 being the time when processing of the input data must begin in order to complete processing at time ts4 when access to the shared media (330) is granted to terminal 2 (320).

As illustrated in FIG. 3b, and FIG. 4, terminal 1 (310) gains access to the shared media (330) at ts3 and terminal 2 (320) gains access at ts4. The packets from terminal 1 (310) are transmitted to the network during Access 1 and once the packets are in the network the additional network latency is incurred (430). The packets of terminal 1 (310) arrive at their destination at ts5. Likewise for the packets from terminal 2 (320) are transmitted to the network during Access 2 and there after incurring network latency (440) and arriving at there destination at ts6.

Figure 5:
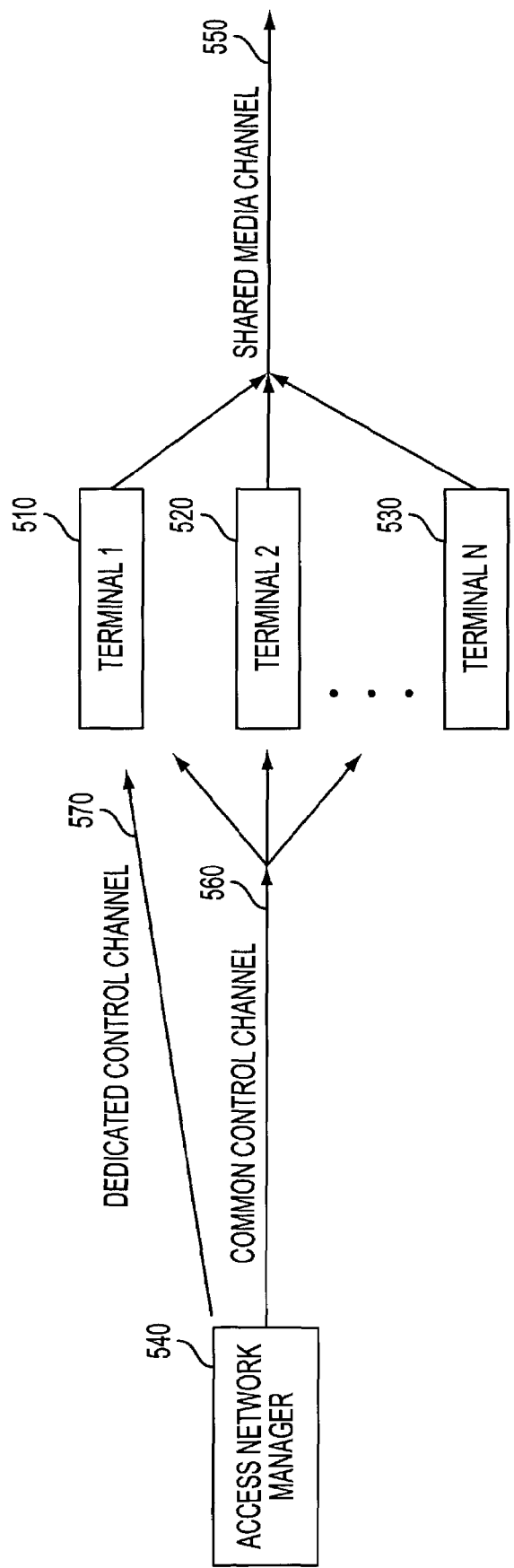
FIG. 5 is a block diagram of an exemplary embodiment of a system where synchronization is implemented.

FIG. 5 shows an example of an embodiment of the present invention illustrating control channels (570, 560) and a shared media channel (550). FIG. 5 shows terminal 1 (510), terminal 2 (520) to terminal N (530) and an access network manager (540). The N terminals transmit over a shared media channel (550). The control channels (570, 560) and a shared media channel (550) may be, for example, wireless or wired interfaces or a combination.

As an example, the access network manager (540) can be part of a base-station in a wireless access network or a head-end in a cable network. The access network manager (540) uses signaling channels in the downlink (from the "base" to the terminals) to control the traffic transmission in the uplink (from the terminals towards the base). In an exemplary embodiment, the Common Control Channel (560) may be used to transmit a common time base to all terminals. Such a Common Control Channel (560) is available in shared media scenarios for management and synchronization processes as well as for other purposes. In certain embodiments it is implemented as a broadcast channel that all terminals are tuned to. However the terminals may use other methods to determine when access to the shared media will be granted. They do not have to rely on having control channels, for example synchronized clocks may be used or the terminals may tune to GPS signals, etc.

A second control channel is used as a dedicated control channel (570). The dedicated control channel (570) may be assigned to a specific terminal n (usually it is assigned to an active terminal). This dedicated control channel (570) in the present embodiment is used to allocate a time frame for each terminal to transmit. Therefore the dedicated control channel (570) is assigned to a specific terminal and is responsible to provide to the specific terminal information as to the point in time when the shared media (550) will be allocated to the specific terminal. At the point in time when the specific terminal is granted access to the shared media channel (550) the specific terminal will transmit its data onto the shared media channel (550).

For example in FIG. 5, the dedicated control channel (570) is used to provide information to terminal 1 (510) allocating a time frame or time period in which terminal 1 (510) is to transmit its packets onto the shared media (550). In the present embodiment Terminal 1 (510) utilizes this information to determine in advance when the shared media (550) will be allocated to terminal 1 (510). By determining in advance when access to the shared media (550) will be allocated, terminal 1 (510) may synchronize its processing of data for transmission such that the processing is completed relatively close to the time for transmission. In an optimum embodiment the processing of data is completed just in time for transmission.

For example, terminal 1 (510) processes input data to prepare the input data as packets for transmission onto the shared media (550). These processes require a period of time to complete i.e. a processing duration. To synchronize the processing of the input data with the point in time for transmission, terminal 1 (510) subtracts the processing duration from the point in time when access will be granted for transmission of processed data. The result provides the point in time when processing of the input data must begin in order to complete the processing close to the time when access to the shared media channel (550) is granted to terminal 1 (510).

Therefore in a system where access to a transmission media is time dependent, the terminal may synchronize the processing of the input data to the time when access to the transmission media will be granted. The terminal needs to determine when access to the transmission media will be granted and synchronize the processing such that completion is relatively close with the grant of access. Each terminal in a system may implement this synchronization process.

In the example illustrated in FIG. 5, terminal 2 (520) to terminal N (530) may each receive the timing-signal transmitted over the Common Control Channel (560) thereby providing a time base to the terminal and to the Packet processing units within each terminal. In this embodiment, each terminal, which has a dedicated control channel assigned to it (not shown), will be able to determine when it will be granted access to the shared media (550). The terminal determines the time for beginning the processing of the input data. In other embodiments the timing information may be determined by other methods rather than the Control Channels.

By way of one example where VoIP processing is performed by the terminal, sampled voice data is processed into packetized data (VoIP data) for transmission on the shared media channel (550). The terminal determines in advance when access will be granted and subtracts the processing duration. The result determines when processing of the input data will begin such that the processing is completed relatively close to when that terminal is granted access to the shared media channel (550).

Figure 6:
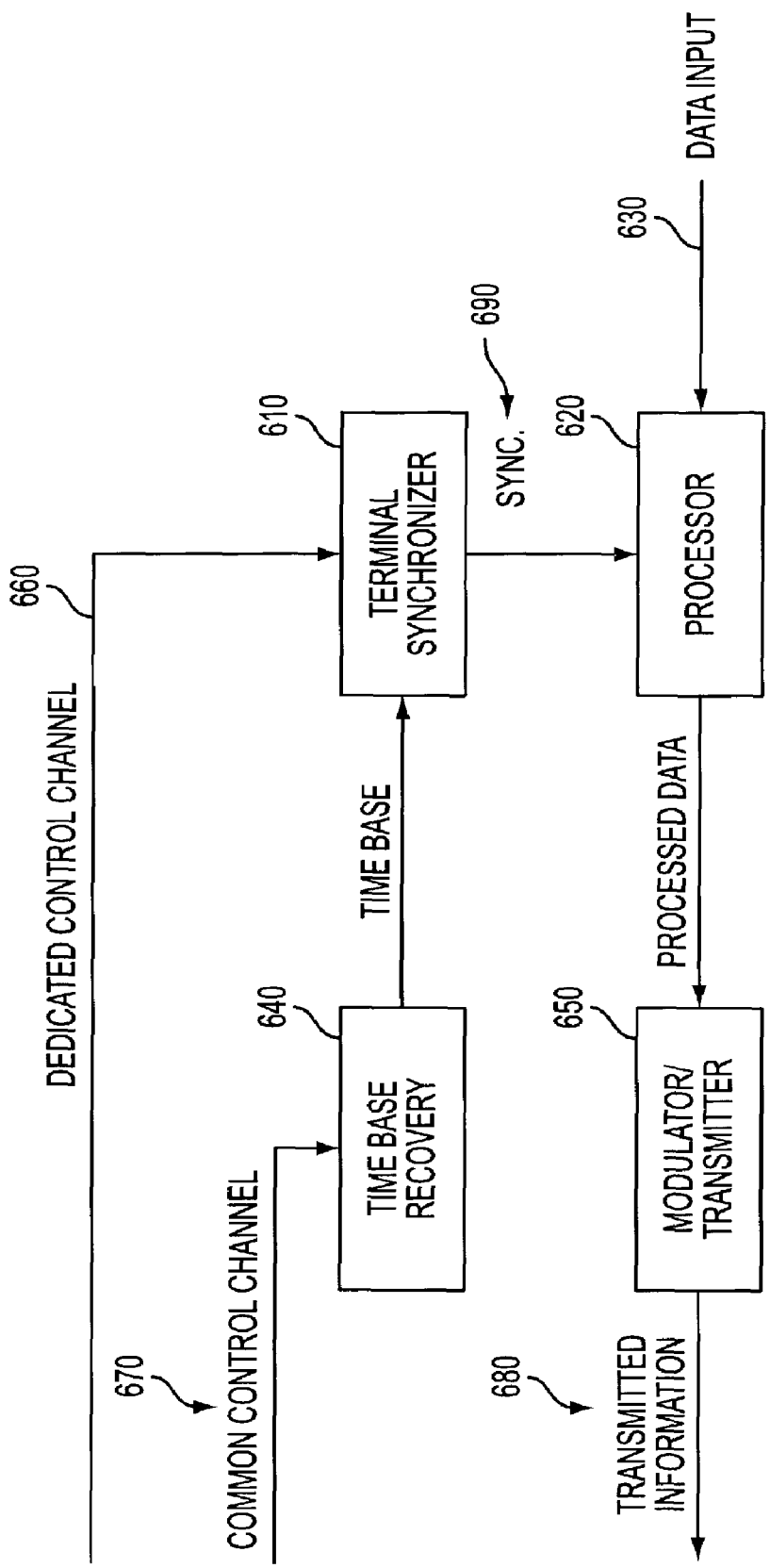
FIG. 6 is a block diagram of an exemplary embodiment of a terminal implementing a synchronization process.

FIG. 6 is one example of a block diagram of a terminal that implements synchronization of the input data processing with the time period when access to transmit the processed data onto shared media is granted to the terminal. The block diagram of a terminal in FIG. 6 may be, for example, the terminal 1 (510) described in the system of FIG. 5. Inputs into the terminal of FIG. 6 include a Common Control Channel (670) and a Dedicated Control Channel (660). A data input (630) provides information to be processed and transmitted on Transmitted Information output (680).

In the terminal of FIG. 6, a time base recovery module (640) receives a timing-signal transmitted over the Common Control Channel (670). The time base recovery module (640) analyzes the received timing-signal and extracts network time base information. The time base recovery module (640) provides network time base information to the terminal synchronizer (610) and to any other component of the terminal where this information may be required. The terminal synchronizer (610) receives an additional timing signal on the dedicated control channel (660). The additional timing signal may include information as to when the terminal should transmit its data to the shared media (680). The terminal synchronizer (610) utilizes the information received from the two inputs to determine a time frame or time period in which the modulator/transmitter (650) is to transmit its packets onto the shared media (680). Additionally the terminal synchronizer (610), upon having the time base from the time base recovery module (640) and upon determining a time frame allocated for transmitting its packets onto the shared media (680), the terminal synchronizer (610) is responsible for calculating a point in time for beginning the processing of the data received on the data input line (630). This, of course, requires the knowledge of the processing duration, which depends on the type of processing.

In this example, the terminal synchronizer (610) provides synchronizing timing information to the processor by signal sync. (690). The timing information is provided to the processor (620), therefore processor (620) will begin processing the input data such that completion of the processed data will occur relatively close to the time when access to the shared media is granted and the processed data may be transmitted onto the shared media.

The processor (620) processes the input data (630) to prepare the input data as packets for transmission and sends them to the modulator/transmitter (650). These processes require a period of time to complete. During this period of time the processor (620) may be preparing the input data to conform to various protocols used in the network. For example the processing performed by the processor (620) may include framing of the input data; coding or compressing the input data to any number of compression algorithms, protocols or standards; and packetizing the input data.

As an example, when the input data is sampled voice, the processor (620) may perform voice processing. The processing duration includes voice processing such as framing, vocoding and packetizing the input data to produce processed voice data.

The present invention may be produced in many different configurations, forms and materials. Those skilled in the art will envision many other possible variations within the scope of the present invention where a shared transmission media is utilized to transfer processed information. In addition those skilled in the art will envision applying many different methods and techniques in synchronizing the processing of information with the time when access is granted for transmitting onto the transmission medium.

What is claimed is:

1. A method of reducing access-delay for transmitting processed data on a transmission media within a network by synchronizing the processing, by one of a plurality of types of processing, of input data to be transmitted with a specific time when the transmission media is to be allocated for transmitting of that processed data, comprising the steps of:
   determining a time when access to the transmission media will be granted for transmitting processed data;
   calculating a processing start time using the determined time when access to the transmission media will be granted for transmitting processed data and a required processing time of the input data based on the type of the processing; and
   synchronizing the processing of the input data with the determined time when access to the transmission media will be granted for transmitting processed data by starting processing at the calculated processing start time, wherein the synchronizing step reduces the access-delay for transmitting the processed data on the transmission media.

2. The method of claim 1,
   wherein the processing is completed at an ideal point in time, which will cause the completion of processing input data to substantially coincide with the point in time when access to the transmission media is granted.

3. The method of claim 2, further comprising the step of:
   receiving a timing signal from the network, the timing signal utilized in determining the point in time when access to the transmission media will be granted;
   processing the input data resulting in packetized data; and
   transmitting the packetized data at the point in time when access to the transmission media is granted.

4. The method of claim 1, wherein the transmission media is shared among a plurality of network devices, each network device allocated a point in time when access to the shared transmission media is granted.

5. A network terminal terminated on a transmission media in a network where the network terminal processes, by one of a plurality of types of processing, input data to be transmitted as processed data on the transmission media, the network terminal allocated a time when access to the transmission media is granted, comprising:
   a processor processing input data to prepare the input data for transmission on the transmission media; and
   a synchronizer calculating a processing start time using the time when access to the shared transmission media will be granted to the network terminal and a required processing time of the input data based on the type of the processing, and synchronizing the processing of the input data to the time when access to the shred transmission media will be granted to the network terminal by starting processing at the calculated processing start time, wherein the synchronizing results in the processing being completed at an ideal point in time, which will cause the completion of processing input data to substantially coincide with the time when access to the shared transmission media is granted.

6. A network terminal terminated on a transmission media in a network where the network terminal processes, by one of a plurality of types of processing, input data to be transmitted as processed data on the transmission media, said network terminal having a specific time when the transmission media is to be allocated for transmitting that processed data, comprising:
   a terminal synchronizer for determining a time when access to the transmission media will be granted for transmitting that processed data, and determining a processing period according to said time based on the type of the processing, the processing period is a period required for processing the input data; and
   a processor for processing of the input data to prepare the input data for transmission on the transmission media, said processing synchronized by said processing period by starting processing at an earlier time based upon the processing period;
   wherein the synchronizing results in the processing of the input data being completed at an ideal point in time, which will cause the completion of processing input data to substantially coincide with said time when access to the transmission media is granted.

7. The network terminal of claim 6, wherein said terminal synchronizer determines a processing period start time by subtracting a time period required to process the input data from said time when access to the transmission media will be granted.

8. The network terminal of claim 6, further comprising:
   a receiver receiving a timing signal from the network; and
   a transmitter transmitting the processed data at said time when access to the transmission media is granted.

9. The network terminal of claim 8, wherein the transmission media is shared among a plurality of network terminals, each network terminal allocated a time when access to the transmission media is granted and said timing signal is received on a control channel.

10. The network terminal of claim 6, wherein said terminal synchronizer determines said processing period depending on the type of processing performed on the input data based on a type of the input data.

* * * * *